US008630258B2

(12) United States Patent
Brisebois

(10) Patent No.: US 8,630,258 B2
(45) Date of Patent: Jan. 14, 2014

(54) FEMTO CELL VISITATION HISTORY FOR AUTOMATIC LOCATION AREA CODE PLANNING

(75) Inventor: Arthur Richard Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1196 days.

(21) Appl. No.: 12/327,470

(22) Filed: Dec. 3, 2008

(65) Prior Publication Data

US 2010/0136984 A1 Jun. 3, 2010

(51) Int. Cl.
*H04W 4/00* (2009.01)
*H04J 3/16* (2006.01)
*H04M 11/00* (2006.01)
*H04M 1/66* (2006.01)
*H04B 1/38* (2006.01)
*G06F 9/445* (2006.01)

(52) U.S. Cl.
USPC ........... 370/331; 370/469; 455/403; 455/411; 455/561; 717/178

(58) Field of Classification Search
USPC ........... 455/403, 561, 411; 707/741; 717/178; 370/469
See application file for complete search history.

(56) References Cited

U.S. PATENT DOCUMENTS

| 7,979,439 | B1* | 7/2011 | Nordstrom et al. | 707/741 |
| 2004/0044999 | A1* | 3/2004 | Gibson | 717/178 |
| 2007/0254620 | A1* | 11/2007 | Lindqvist et al. | 455/403 |
| 2008/0144663 | A1* | 6/2008 | Johnson et al. | 370/469 |
| 2008/0207170 | A1* | 8/2008 | Khetawat et al. | 455/411 |
| 2008/0305835 | A1* | 12/2008 | Johnstone et al. | 455/561 |

OTHER PUBLICATIONS

Akl, et al. "Impact of Interference Model on Capacity in CDMA Cellular Networks" (2004) SCI 04: Communication and Network Systems, Technologies and Applications, 5 pages.

* cited by examiner

*Primary Examiner* — Ian N Moore
*Assistant Examiner* — Kiet Tang
(74) *Attorney, Agent, or Firm* — Turocy & Watson, LLP

(57) ABSTRACT

System(s) and method(s) are provided for automatic radio paging parameter planning. For location area update (LAC), reuse plan is based at least in part on actual subscriber mobility in a set of deployed femto access points (APs). Mobility data is incorporate in LAC planning through a visitation matrix spanned by the set of deployed femto APs. Visitation matrix elements are counts of failed attachment attempts, or unwelcomed visits, from a subscriber station authorized to attach to a first femto AP into a second femto AP in which the subscriber station is not authorized to attach. Automatic LAC planning is achieved iteratively through a search algorithm that minimizes a cost function related to unwelcome visits, and through a planning principle that assigns disparate LACs to pairs of femto APs with high reciprocal unwelcome visits and same LACs to pairs of femto APs with low reciprocal unwelcome visits.

17 Claims, 11 Drawing Sheets

FEMTO CELL VISITATION HISTORY FOR AUTOMATIC LOCATION AREA CODE PLANNING

TECHNICAL FIELD

The subject innovation relates to wireless communications and, more particularly, to automatic radio paging area parameters based at least in part on actual subscriber visitation history.

BACKGROUND

Femto cells—building-based wireless access points interfaced with a wired broadband network—are generally deployed to improve indoor wireless coverage and to offload a mobility radio access network (RAN) operated by a wireless network and service provider. Femto cells typically operate in licensed portions of the electromagnetic spectrum, and generally offer plug-and-play installation; e.g., automatic configuration of femto access point. Improved indoor coverage includes stronger signal and improved reception (e.g., voice or data), ease of session or call initiation, and session or call retention as well. Offloading a RAN reduces operational and transport costs for a service provider since a lesser number of end users utilizes over-the-air (OTA) radio resources (e.g., radio frequency bands and channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce cross-talk among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements via femto cells can also mitigate customer attrition as long as a favorable subscriber perception regarding voice coverage and other data services with substantive delay sensitivity, or otherwise, is attained. In addition, a richer variety of wireless voice and data services can be offered to customers via a femto cell since such service offerings do not rely primarily on mobility RAN resources.

To ensure an improved perception of wireless service via femto coverage, access control has to be minimally disruptive in connection with preservation of mobile device battery life. Access control is one of the base requirements for femto cell network operation. Each femto access point (AP) and macro cell sector broadcast a specific, yet not always unique location are code (LAC); non-uniqueness of LAC typically is reflected in LAC reuse throughout a macro sectors and femto APs deployments. Generally, subscriber station looks for changes in received LAC prior to attempting to attach to new macro or femto sectors, or access points. In response to attachment signaling, a femto cell AP must allow or disallow subscriber stations to attach, camp and place calls. To that end, femto APs can utilize the status (e.g., allowed or disallowed) of the subscriber station within a specific access lists associated with respective femto APs. If disallowed, the subscriber station is to be rejected in such a way as to allow normal service on the macro network or emergency-only service on the femto AP.

While various legacy rejection mechanisms are available, legacy LAC planning for macro network and access control mechanisms do not optimize LAC reuse to minimize utilization of rejection techniques that can recurrently reject subscriber stations that, in view of mobility aspects, recurrently attempt attachment with femto APs that do not allow the subscriber station to attach. Instead typical legacy mechanisms plan LAC according to interference measurements or reuse distance. Such planning can fail to address real-world mobility situations associated with subscribers of macro and femto networks as the subscriber routinely travel. Such failure may result in optimal access control to macro and femto coverage with suboptimal battery life, with ensuing detriment to subscriber perceived experience.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for automatic radio paging parameter planning. For location area update (LAC), reuse plan is based at least in part on actual subscriber mobility in a set of deployed femto access points (APs). Mobility data is incorporate in LAC planning through a visitation matrix spanned by the set of deployed femto APs. Visitation matrix elements are counts of failed attachment attempts, or unwelcomed visits, from a subscriber station authorized to attach to a first femto AP into a second femto AP in which the subscriber station is not authorized to attach. Automatic LAC planning is achieved iteratively through a search algorithm that minimizes a cost function related to unwelcome visits, in combination with a LAC planning principle that assigns disparate LACs to pairs of femto APs with high reciprocal unwelcome visits and same LACs to pairs of femto APs with low reciprocal unwelcome visits. Search algorithms include Monte Carlo, simulated annealing, genetic algorithm, tabu search, or the like. It is noted that the aspects and features of the subject innovation related to automatic LAC planning can be applied to substantially any, or any, radio paging parameters in a femto network.

Aspects, features, or advantages of the subject innovation described the subject specification can be exploited in substantially any wireless communication technology, in connection with access point power management. For instance, Wi-Fi, Worldwide Interoperability for Microwave Access (WiMAX), Enhanced GPRS or Enhanced Data Rates for GSM (EDGE), 3rd Generation Partnership Project (3GPP) Long Term Evolution, 3rd Generation Partnership Project 2 (3GPP2) Ultra Mobile Broadband, 3GPP Universal Mobile Telecommunication System (UMTS), High-Speed Packet Access, or Zigbee. Additionally, substantially all aspects of the subject innovation as disclosed in the subject specification can be exploited in legacy telecommunication technologies such as GSM.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
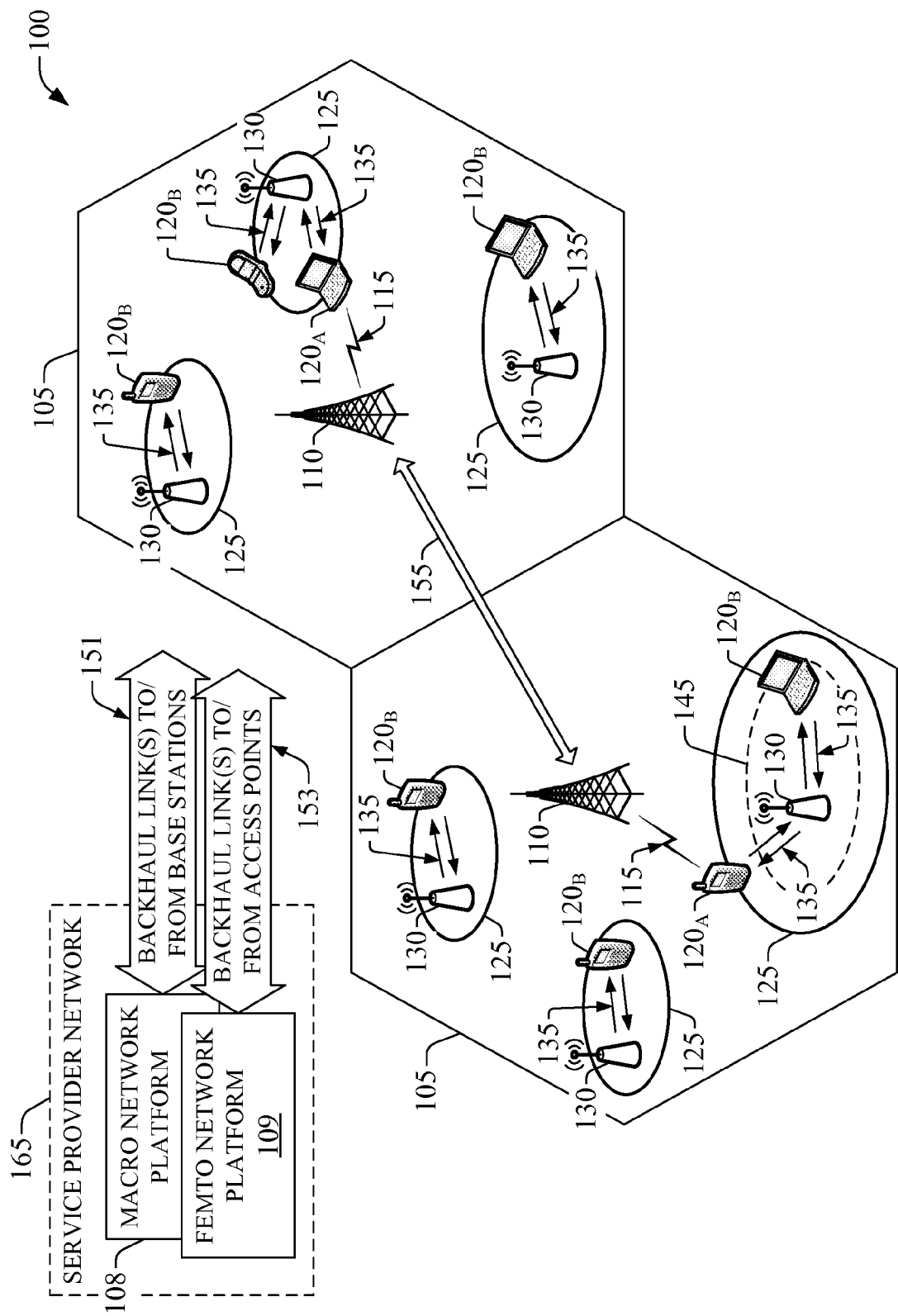
FIG. 1 illustrates a schematic deployment of a macro cells and a femto cells for wireless coverage, wherein femto cell access points can exploit aspects of the subject innovation.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "constructor," "engine," "interface" and the like are intended to refer to a computer-related entity or an entity related to an operational machine with one or more specific functionalities. The entities disclosed herein can be either hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, terms like "user equipment," "mobile station," "mobile," subscriber station," "access terminal," "terminal," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "Home Access Point," and the like, are utilized interchangeably in the subject application, and refer to a wireless network component or electronic appliance that serves and receives data, control, voice, video, sound, gaming, or substantially any data-stream or signaling-stream from a set of subscriber stations. Data and signaling streams can be packetized or frame-based flows. In addition, the terms "femto cell access point" and "femto access point" are utilized interchangeably.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE 120$_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, like Iu-CS, Iu-PS, Gi, Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can be initiated even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 3:
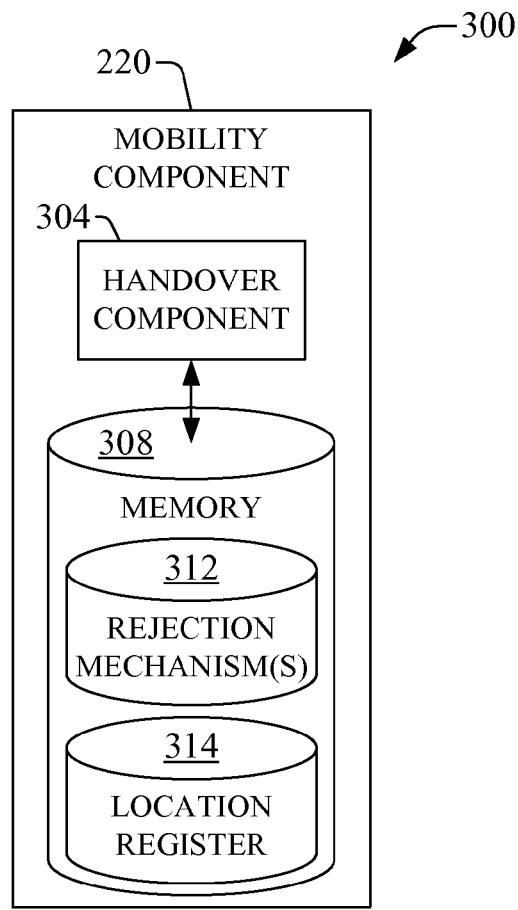
FIG. 3 illustrates a block diagram of an example embodiment of a mobility component that is part of an example system to automatically generate LAC reuse plan(s) in accordance with aspects described herein.
Figure 4:
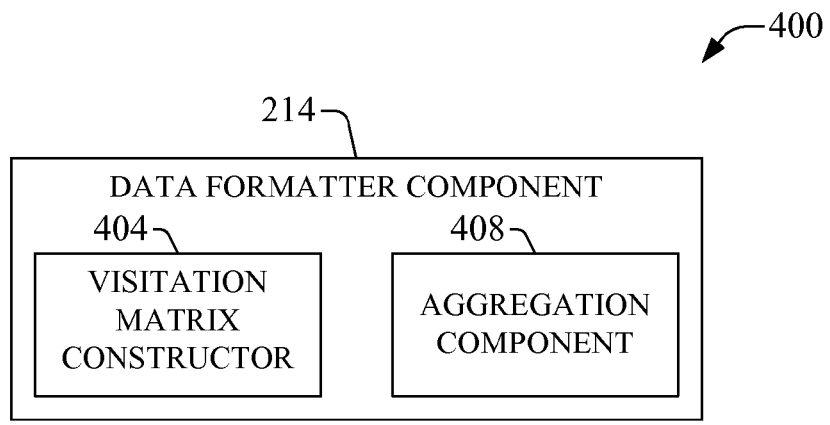
FIG. 4 illustrates a block diagram of an example embodiment of a data formatter component that is part of an example LAC engine within an example system to automatically generate LAC reuse plan(s) in accordance with aspects described herein.

Automatic generation of radio paging parameters, e.g., LAC assignments, and reuse plan thereof per femto AP that are based at least in part on actual subscriber and femto AP mobility history are discussed next. An illustrative example system that facilitates generation of location area code (LAC) is presented in FIG. 2, and where convenient for clarity of explanation, FIGS. 3 and 4 are referenced to further illustrate operation of the example system.

Figure 2:
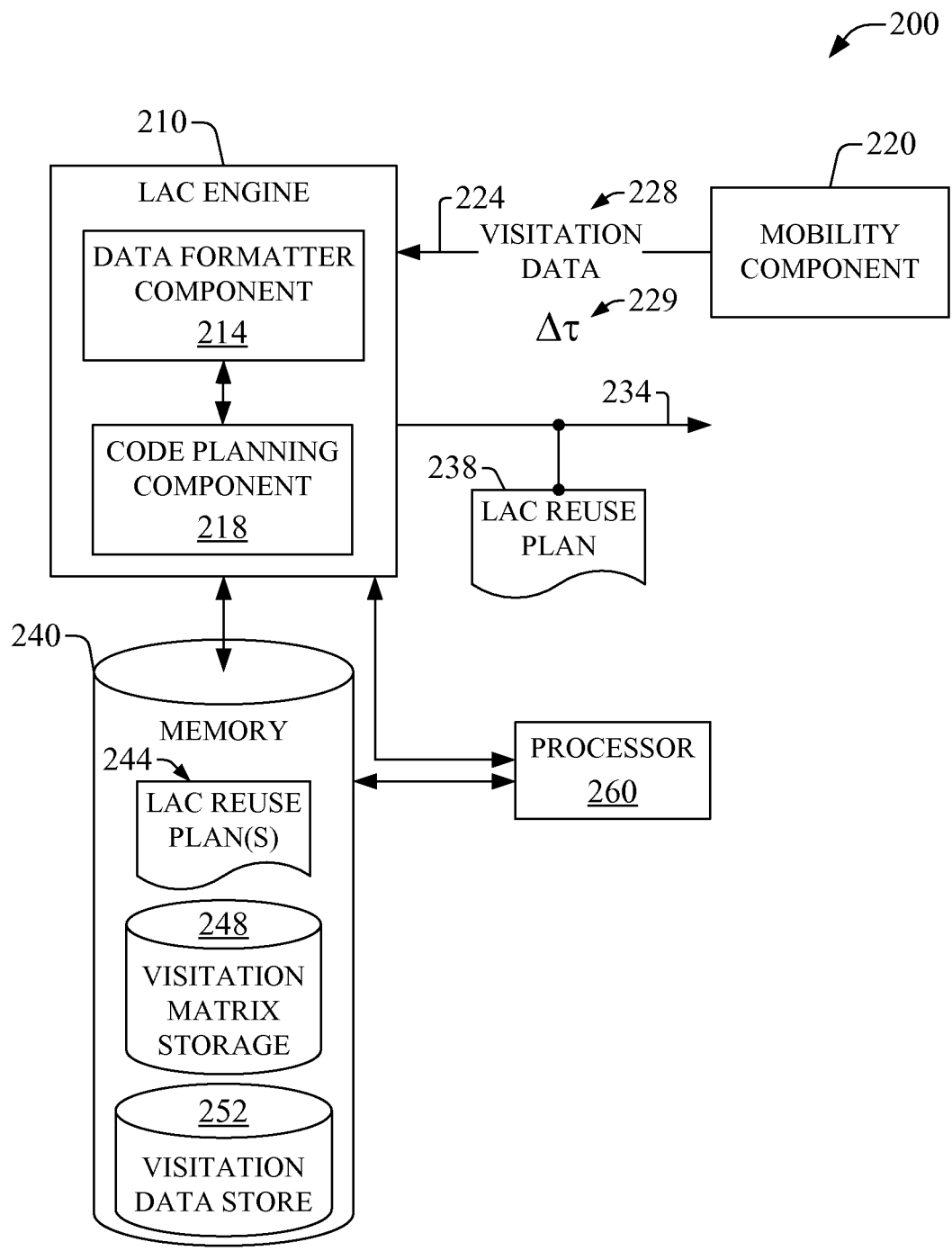
FIG. 2 is a block diagram of an example system that facilitates automatic generation of location area code (LAC) reuse plan, or LAC plan, in accordance with aspects described herein.

FIG. 2 is a block diagram of an example system 200 that facilitates automatic generation of location area code (LAC) reuse plan, or LAC plan, in accordance with aspects described herein. It is noted that example system 200 also can be employed to generate substantially any, or any, radio paging parameter and associated reuse plan thereof. In example system 200, a LAC engine 210 receives visitation data 228 via a network link 224 (e.g., a reference link) from a mobility component 220. It is noted that visitation data can be collected within a predetermined sampling time $\Delta\tau$ 229, which can range from a day to several days. Visitation data 228 reveals actual mobility scenarios associated with mobile devices within a deployed femto network, and includes information on accepted and rejected attachment procedures (e.g., location area update procedure(s)) of a mobile station (e.g., UE $120_A$) with a femto access point (e.g., femto AP 130). In an aspect, as illustrated in FIG. 3, mobility component 220 can include a handover component 304 that can count or monitor the number of failed attachment procedures associated with a mobile device and a femto access point identified at least in part through a specific LAC, wherein the mobile device is not authorized to attach to the femto access point. In an aspect, authorization to attach to a femto AP can be granted through an access list, e.g., a whitelist, that includes unique identifiers of respective mobile devices that can access femto coverage through a specific femto AP. When an attachment procedure is successful, mobility component 220 can update location register 314 (e.g., home location register, visited location register, home agent memory . . . ) to reveal to the femto network platform 109 the new location of the mobile device. Conversely, when a mobile device fails an attachment procedure, mobility component 220 can implement various rejection mechanisms, which can be retained in rejection mechanism(s) 312 in memory 308. As an example, two conventional rejection mechanisms can be utilized by mobility component 220: (1) LAC reject.—If the mobile device is not allowed to receive femto coverage through a femto AP, the femto AP can reject the Location Area Update (LAU) in such a way as to prevent the mobile device from camping on any sector, or femto AP, that utilizes the same LAC for a predetermined period of time; e.g., at least 18 hours or a power cycle, whichever arises first. LAC reject is relatively efficient as the mobile device will avoid the unauthorized femto AP, and any other femto AP with the same LAC, for a substantive time interval, with relatively little signaling expended between the mobile device and the unauthorized femto AP or likewise identified femto APs. It should be appreciated that emergency calls can be placed on the unauthorized femto AP while no other service is available. It is noted that LAC reject can prevent the mobile device from attachment to a disparate femto AP with the same LAC for which camping and access is allowed. The latter can be a problem when the rejected LAC is the same as the LAC used at home femto AP. In such case the mobile device will not camp on home femto AP within 18 hours or power cycle, whichever is first to arise.

(2) Cell Barred.—If the UE is not allowed to be covered through a femto AP, the femto AP can reject the Location Area Update (LAU) in such a manner as to prevent the UE from camping on any sector using the LAC, e.g., scrambling code, for a time interval that span nearly 21 minutes. Cell barred rejection mechanism can add an additional layer of control in situations where LACs are reused between a femto AP that allows coverage for the mobile device that attempts attachment and a femto AP that disallows access thereto. It is noted that the rejected UE cannot place emergency calls on the femto AP, or sector, that rejects attachment in accordance with cell barred mechanism. It should be appreciated that this mechanism also is relatively inefficient in preventing an unauthorized UE from a disparate attempt to attach to an unauthorized femto AP, since the rejection is to be repeated nearly three times every hour. Accordingly, in terms of signaling and battery load, cell barred rejection is nearly 54 times as costly as LAC reject mechanism, and thus it is to be used sparingly in order to mitigate battery draw from mobile devices within a femto network.

In LAC engine 210, visitation data 228 can be formatted through data formatter component 214 which can cast the received data in a suitable format to be exploited by code planning component 218 to automatically generate a LAC reuse plan 238 based at least part on received visitation data 228. Data formatter 214 can aggregate data to generate record(s) of historic data via aggregation component 408. Data formatter component 214 can arrange data in a visitation matrix via a visitation matrix constructor 404, as illustrated in FIG. 4. In an aspect of the subject innovation, a visitation matrix can reveal relationship(s) among subscriber(s) mobility and deployed femto access points in a femto network, and facilitate LAC planning so as to provide maximum femto cell access control with minimum signaling and battery life impact. A visitation matrix can be constructed through the enumeration of unwelcome, e.g., non-authorized, attempts of a subscriber station authorized for femto service through a first femto AP to gain femto service through a second femto AP in which the mobile subscriber is not authorized to attach. As described above, such enumeration can be included in visitation data 228. A visitation matrix element is set equal to the number of unwelcome attempts. It is noted that a visitation matrix has integer matrix elements and zeroes in its diagonal. In addition, a visitation matrix is not necessarily a symmetric matrix since visitation to a second femto AP of a mobile device authorized in a first femto AP need not coincide with mobility features of a mobile device authorized in the second femto AP with respect to visitation to the first femto AP.

It should be appreciated that a visitation matrix has at least one advantage over an interference matrix, conventionally employed in automatic LAC planning in macro network: A visitation matrix incorporates non-random mobility features associated with actual visitation of deployed femto APs by a subscriber station that travels a femto network deployment. Conversely, when utilizing an interference matrix for automatic LAC planning, subscriber mobility is relatively random and modeled poorly; e.g., via Monte Carlo-based approach(es).

To exploit a visitation matrix and achieve a LAC reuse plan that minimizes overall number of "unwelcome visits," and ensuing reduced signaling activity and unnecessary battery load, a LAC reuse plan can be iteratively constructed in such a manner that attachment rejection events are directed to LAC reject for femto subscribers, or femto access points, with the most reciprocal unwelcome visits, and cell barred rejection mechanism for femto subscribers, or femto access points, with the least reciprocal unwelcome visits. Therefore, construction of LAC reuse plan is based at least in part on usage of different LAC in AP pairs with the most reciprocal unwelcome visits, which can lead to LAC reject mechanism among the pair of femto APs, and same LAC in AP pairs with the least reciprocal unwelcome visits which can lead to cell barred rejection mechanism among the pair of femto APs. In view of the substantive number of femto APs in a femto network, various LAC reuse plans or configurations that equalize a set of LACs for femto AP pairs with low reciprocal unwelcome visits are possible. Likewise, several LAC configurations that replace LACs for pairs of femto APs with high unwelcome visits are possible. Accordingly, in an aspect of the subject innovation, a constrained minimization of overall unwelcome visits can be implemented through code planning component 218. Such implementation results an iterative automatic determination of LAC reuse plan 238 based at least in part on minimization of a cost function, based at least in part on values of visitation matrix elements, through successive reconfiguration of LAC assignments to a set of deployed femto access points in a femto network. An example embodiment of a code planning component 218 that can facilitate search of LAC reuse plan 238 is discussed below.

Generated LAC reuse plan 238, constructed based at least in part through iterations upon the foregoing principle, can be delivered through a network link 234 (e.g., a reference link). In an aspect, a network management component receives LAC reuse plan 238 for configuration of deployed femto access points (e.g., femto AP 130). In another aspect, LAC reuse plan 238 can mitigate unnecessary signaling associated with attachment of a mobile device (e.g., UE $120_A$) to a femto access point (e.g., femto AP 130) in which the mobile device is not authorized to access femto coverage, and ensuing mitigation of battery draw in the mobile device.

Location area code engine 210 retains automatically generated LAC reuse plan(s) 244 in memory 240; it should be appreciated that memory 240 can reside within a femto network platform 109 or within a macro network platform 108. Such historic LAC reuse plan(s) 244 can be employed as "seed" reuse plans when a femto network deployment is updated, e.g., one or more additional femto APs are provisioned, or when subscriber mobility pattern changes. It should be appreciated that a current LAC plan reuse also can be employed to automatically generate an update LAC reuse plan; however, utilization of disparate LAC reuse plan can facilitate the search or optimization algorithm utilized by code planning component 218 to escape initial local minima in the space of unwelcome, or unauthorized, femto AP visitation with respect to LAC plan configurations. In addition, LAC engine 210 can retain visitation matrices in visitation matrix storage 248, and received visitation data 228 in visitation data store 252.

Processor 260 can be configured to confer, at least in part, functionality to components in example system 200, or execute one or more components therein. To at least that end, processor 260 can execute code instructions or program modules (not shown) stored in memory 240, and exploit related data structures (e.g., objects, classes).

Figure 5:
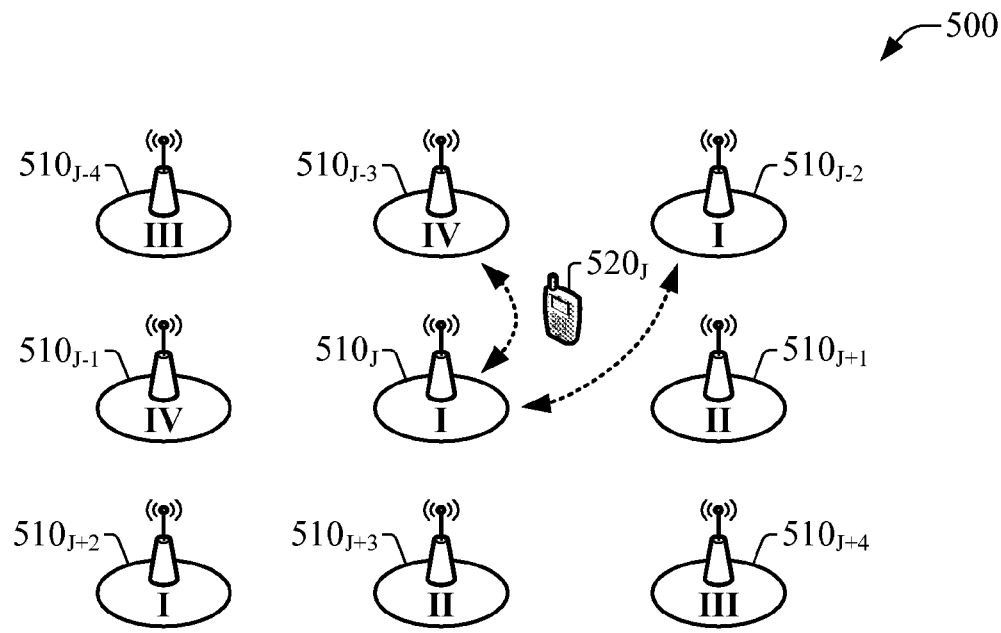
FIG. 5 illustrates diagrams of an example deployment set of femto access points and a related example visitation matrix in accordance with aspects described herein.

FIG. 5 illustrates diagrams 500 and 550 of a set of femto access points and a visitation matrix, respectively, in accordance with aspects described herein. With respect to diagram 500, nine femto APs $510_{J-4}$-$510_{J+4}$, with J a natural number greater than four, embody a set of femto APs that can be visited by a subscriber, e.g., UE $520_J$, that is authorized to attach and receive femto coverage through femto AP $510_J$.

Femto APs $510_{J-4}$-$510_{J+4}$ are assigned location area codes, indicated through roman numerals I-IV, with a specific reuse plan. In diagram 500, subscriber station $520_J$ is not authorized to attach to femto APs $510_{J-4}$-$510_{J-1}$ and femto APs $510_{J+1}$-$510_{J+4}$. Accordingly, each time subscriber station $520_J$ attempts to gain access to femto AP that is not femto AP $510_J$, the subscriber station $520_J$ is rejected according to one or more of various rejection mechanisms. For instance, based upon the assigned LAC, when subscriber station $520_J$ attempts to attach to femto AP $510_{J-3}$, LAC reject can be enacted through a mobile network platform (e.g., femto network platform 109). In addition, when subscriber station $520_J$ attempts to attach to femto AP $510_{J-2}$, the subscriber station $520_J$ can receive a cell barred rejection. It should be appreciated that in example deployment 250 with the illustrated LAC reuse plan, subscriber station $520_J$ also experiences a cell barred rejection when it visits femto AP $510_{J+2}$. Thus, if subscriber station $520_J$ regularly travels along the neighborhood of the path that connects femto APs $510_{J-2}$, $510_J$, and $510_{J+2}$, a substantive battery draw can be expected. Conversely, subscriber station $520_J$ visitation to other femto APs within the illustrative example deployment 250 would results in improved battery draw, since rejection to service for such femto APs obeys LAC reject, and thus subscriber station $520_J$ is bar from accessing service for substantially longer time when compared to travel along the path that connects femto APs with LAC code I.

As discussed above, to reveal relationship among subscriber(s) mobility and facilitate LAC planning, a visitation matrix can be constructed. Based at least in part on illustrative example deployment 500, a 9×9 visitation matrix can be assembled through enumeration of non-authorized attachment attempts of a subscriber station (e.g., UE $520_J$) authorized for femto service through a first femto AP (e.g., AP $510_J$) to gain femto service through a second femto AP (e.g., femto AP $510_{J+1}$) in which the mobile subscriber is not authorized to attach. Visitation matrix elements are set equal to the number of unwelcome attempts (e.g., $N_{J,J+1}$).

Figure 6:
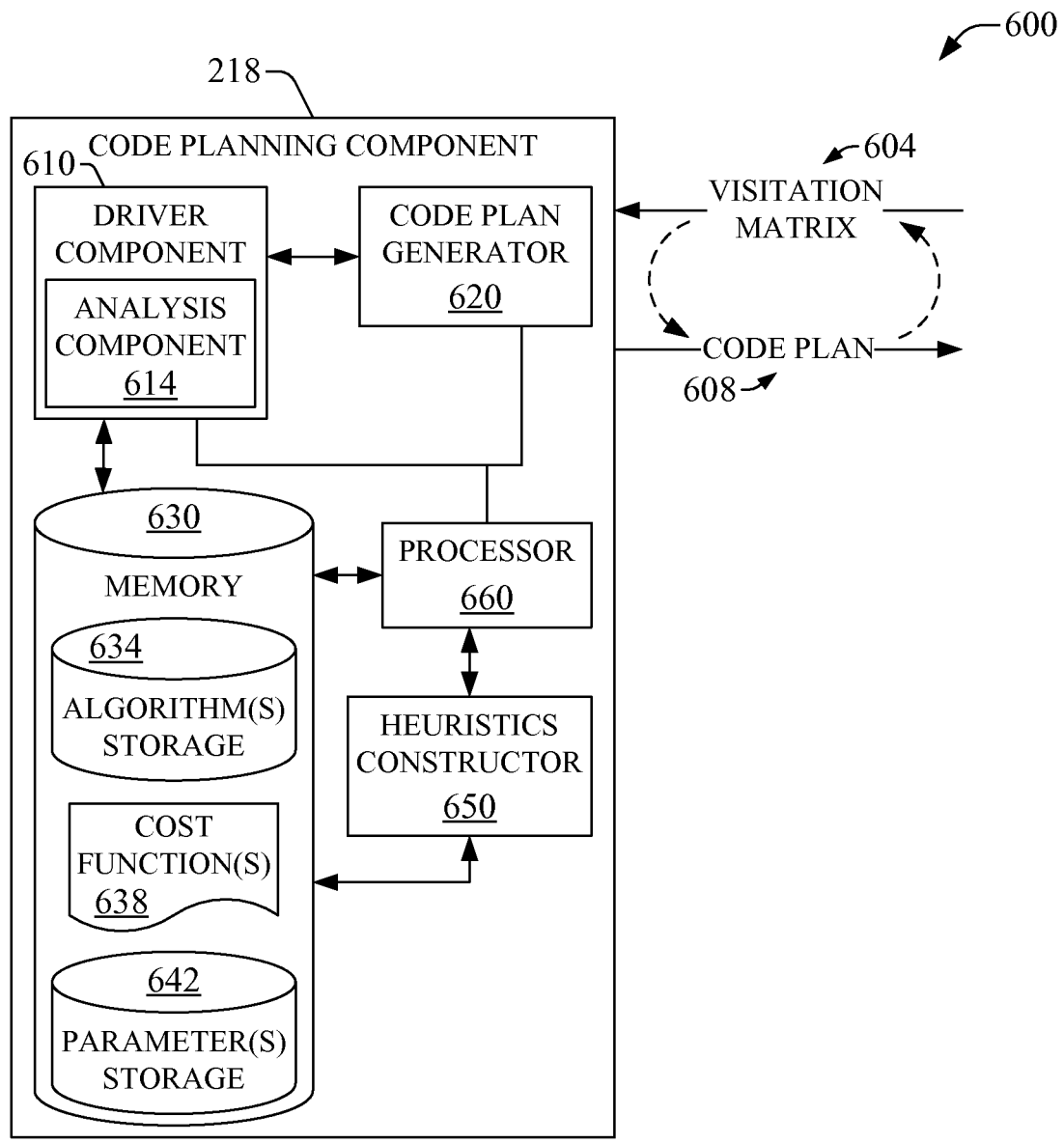
FIG. 6 illustrates a block diagram of an example embodiment of a code planning component that facilitates automatic generation of code reuse plan(s), or code plan(s), in accordance with aspects described herein.

FIG. 6 illustrates a block diagram of an example embodiment 600 of a code planning component that facilitates automatic generation of code reuse plan(s), or code plan(s), in accordance with aspects described herein. To automatically generate a code plan 608, e.g., LAC reuse plan, code planning component 218 receives a visitation matrix 604 associated with a current code reuse plan and generates an iteration of a code plan 608, or updated code plan, based at least in part on the received visitation matrix 604. Code planning component 218 conveys the updated code plan 608 and receives an updated visitation matrix 604. As discussed above, code planning component 218 automatically identifies, after a number of iterations (illustrated as dashed arrows in FIG. 6), code combinations, e.g., LAC code plan reuse 238, which results in the least overall number of "unwelcome visits," and ensuing reduced signaling activity and unnecessary battery draw. To at least that end, code planning component 218 includes a driver component 610 that can implement an algorithm that searches minima of a cost function that depends at least in part on "unwelcome visits" counts or matrix elements of a current visitation matrix, which can be related to mutual interference among pairs of femto APs, at least one femto AP in the pair visited by a non-authorized mobile device. To proceed with a search of a suitable code reuse, driver component 610 exploits a code plan generator 620 which updates a current code reuse plan in accordance with the specific implemented search algorithm. In an aspect, code plan generator 620 can include a random number generator to facilitate random selection of pairs of APs with the highest reciprocal unwanted visits or the lowest reciprocal unwanted visits. In another aspect, code plan generator 620 can compute statistics of visitation matrix elements to determine a first threshold that establishes a level above which reciprocal unwanted visits are deemed the highest, and a second threshold below which reciprocal unwanted visits are deemed the lowest. With computed statistics, and to generate a new iteration of code plan configuration, code plan generator 620 can assign different LACs to one or more pairs of femto access points with unwelcome visit counts above the first threshold, and same LACs to one or more pairs of femto APs with unwelcome visit counts below the second threshold. Analysis component 614 can accept or reject new code reuse plan iterations, or configurations, based on at least one of evaluation of the cost function or criteria determined through a set of heuristic parameters which can be retained in parameter(s) storage 642. Heuristic parameters utilized by analysis component 614 to facilitate to drive the algorithm include optimization tolerance, or tolerance, which acts as a threshold that determines termination of the algorithm when the cost function reaches the threshold. When the tolerance threshold is reached, analysis component identifies a code reuse plan, or configuration, that has minimized the cost function and thus the overall number of "unwelcome visits." In an aspect, cost function(s) can depend at least in part on values of visitation matrix elements, and can be stored in memory element cost function(s) 638. Search algorithms can be stored in memory element algorithm(s) storage 634, and can include Monte Carlo, simulated annealing, genetic algorithm, tabu search, or the like. It should be noted that algorithm(s) employed to generate a code reuse plan can be based on combination of disparate algorithms. The employed algorithm(s) also can proceed further to reduce total number of unwelcome same-LAC visits to a minimum.

Code planning component 218 also includes a heuristics constructor 650 that can generate a set of heuristic parameters associated with implementation of a search algorithm. For example, heuristics constructor can determine at least one of a cost function; an optimization tolerance; a set of parameters that facilitate generation of a code reuse configuration such as a set of codes, e.g., LACs, to equalize or modify based at least in part on magnitude of visitation matrix elements; or the like. The set of codes, e.g., LACs, to equalize or modify can determine a strategy to generate a new code reuse configuration. For example, once a set of pairs of femto APs with unwelcome visits above a threshold for high level of visitations is identified, a number of code reuse configurations can be generated.

In an aspect, heuristics constructor 650 can collect historic data related to heuristics parameters, and infer new heuristics parameters; as employed herein, to infer refers to reason and draw a conclusion based upon a set of metrics, arguments, or known outcomes in controlled scenarios. To carry out such inference(s), heuristics constructor 650 can exploit artificial intelligence (AI) methods. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., a set of heuristic parameters and associated performance of search algorithm(s) based thereupon. Processor 660 can perform at least a portion of the computations necessary to implement the AI methods exploited by heuristics constructor 650.

In particular, to infer and establish signaling metric threshold(s), intelligent component 405 can employ one of numerous methodologies for learning from data and then drawing inferences from the models so constructed. In an aspect, the methodologies can be retained, at least in part, on algorithm(s) storage 634. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

Processor 660 can be configured to confer, at least in part, functionality to components in example embodiment 600, or execute one or more components therein. To at least one or more of such ends, processor 660 can execute code instructions or program modules (not shown) stored in memory 240, and exploit related data structures (e.g., objects, classes).

Figure 7:
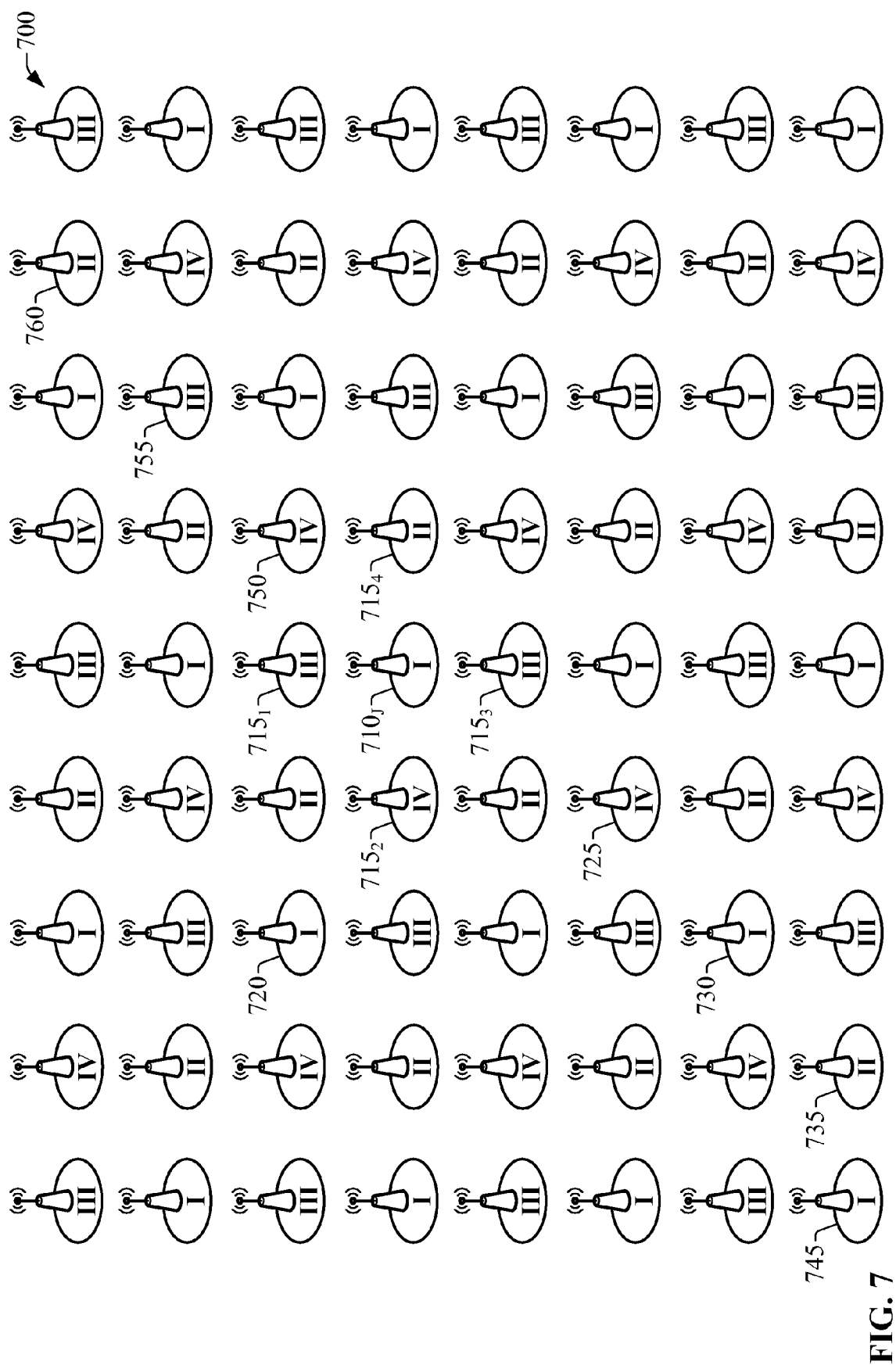
FIG. 7 illustrates an example LAC reuse plan configuration in which subscriber station mobility in a first direction results in reduce battery life, whereas mobility in a second direction results in improved battery life.

FIG. 7 illustrates an example LAC reuse plan configuration 700 in which subscriber station mobility in a first direction results in reduce battery life, whereas mobility in a second direction results in improved battery life. Reuse configuration 700 is based primarily upon listen range from home femto AP $710_J$, with maximization of LAC distance: LAC I is reused in second and third nearest neighbors within the example square lattice deployments. For instance, femto AP 720, with LAC I, is a third nearest neighbor. When a mobile device with home femto AP $710_J$, which has a LAC I, visits unauthorized femto AP 745 with LAC I, the mobile device is rejected with a cell barred mechanism. As the mobile device moves towards home femto AP $710_J$, it encounters femto AP 735 with LAC code II, so the mobile device is rejected with LAC reject, yet when the mobile device encounters femto AP 730 with LAC I, the mobile device can be rejected with cell barred in case the time elapsed since the mobile device visited femto AP 745 is longer than 21 minutes. As the device continues towards femto AP $710_J$, it can encounter femto AP 725 with LAC IV and thus be rejected with LAC reject. When the mobile device visits femto AP $715_3$, it is once again rejected with LAC reject. Accordingly, when the mobile device reaches home femto AP $710_J$, it has endured two cell barred rejections based upon failed authorization to attach. Thus, in such a path, the mobile device experiences battery life reduction. In contrast, when mobile device reaches home femto AP $710_J$ through visitation of femto APs 760, 755 and 750, the mobile device faces LAC reject multiple times but it fails to incur cell barred; thus, battery life along such a path present improved battery life.

Figure 8:
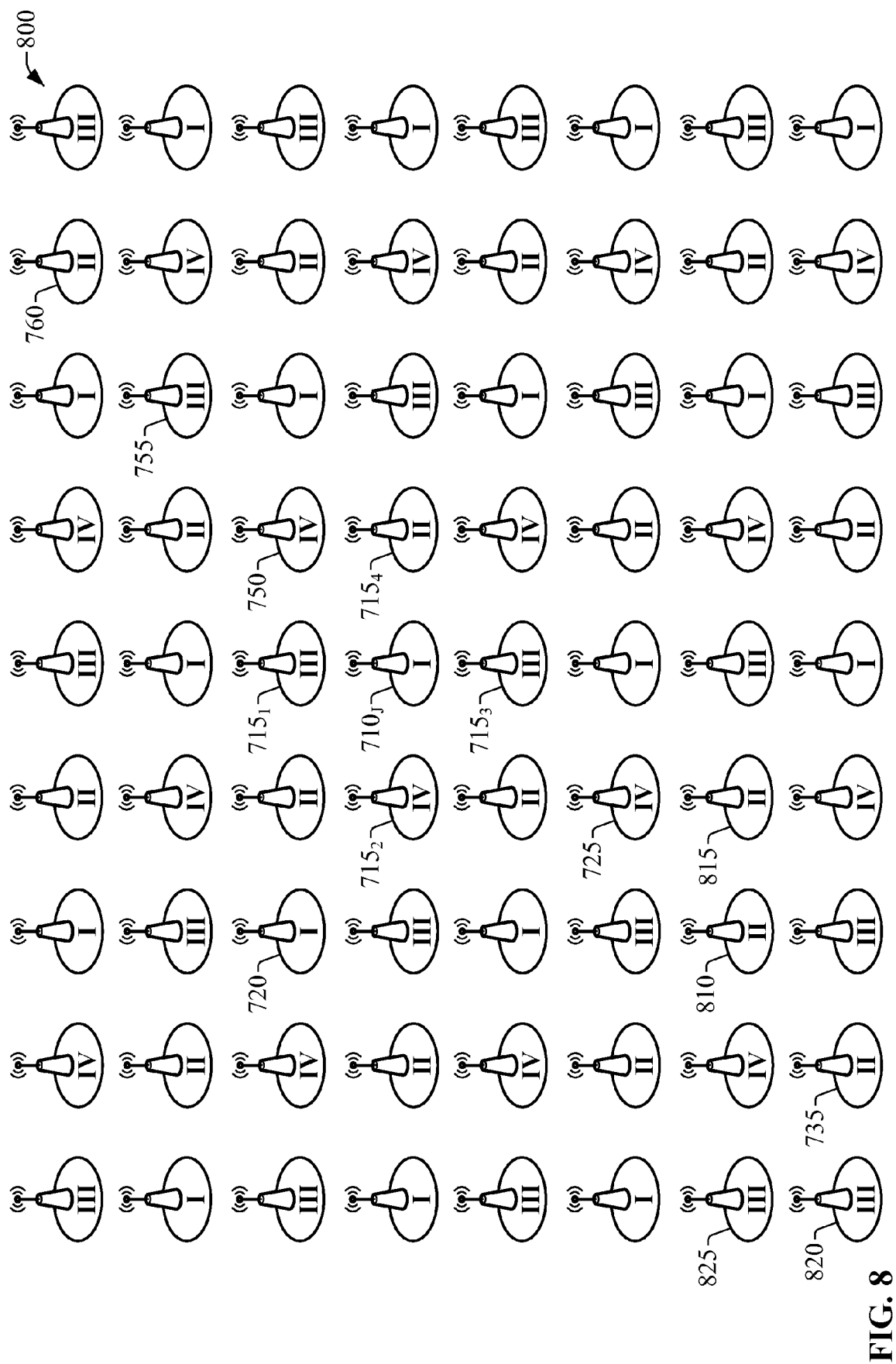
FIG. 8 illustrates an example LAC reuse plan configuration that corresponds to reuse configuration of FIG. 7 updated based at least in part upon visitation history.

FIG. 8 illustrates an example LAC reuse plan configuration 800 that corresponds to reuse configuration 700 updated based at least in part upon visitation history. In reuse configuration 800, femto AP 820 possesses LAC III instead of LAC I, as it was the case in reuse configuration 700. Likewise, femto AP 810 has LAC II rather than LAC I as it was the case in reuse configuration 700. Accordingly, LAC reuse configuration 800 provides improved battery life. It should be appreciated that for a subscriber with home femto AP $715_4$ with LAC II, life battery can be compromised if a mobile station travels a path that visits femto AP 815 and femto AP 810. Likewise, a subscriber station with home femto AP $715_3$ can suffer increased battery degradation when the subscriber station travels a path that visits femto AP 825 and femto AP 820, both having LAC III.

Figure 9:
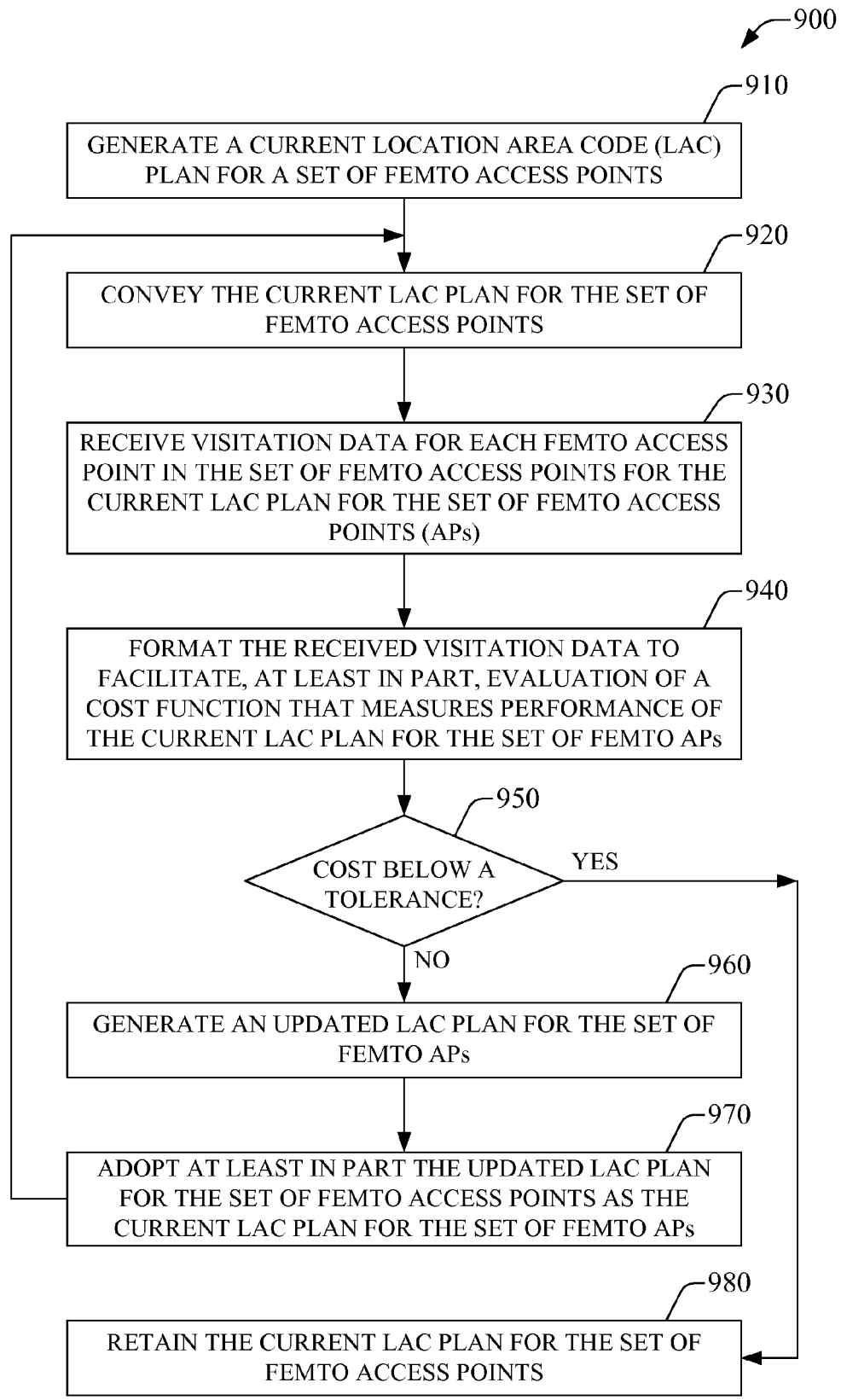
FIG. 9 is a flowchart of example method for automatically generating a location area code plan, or reuse plan, according to aspects described herein.
Figure 10:
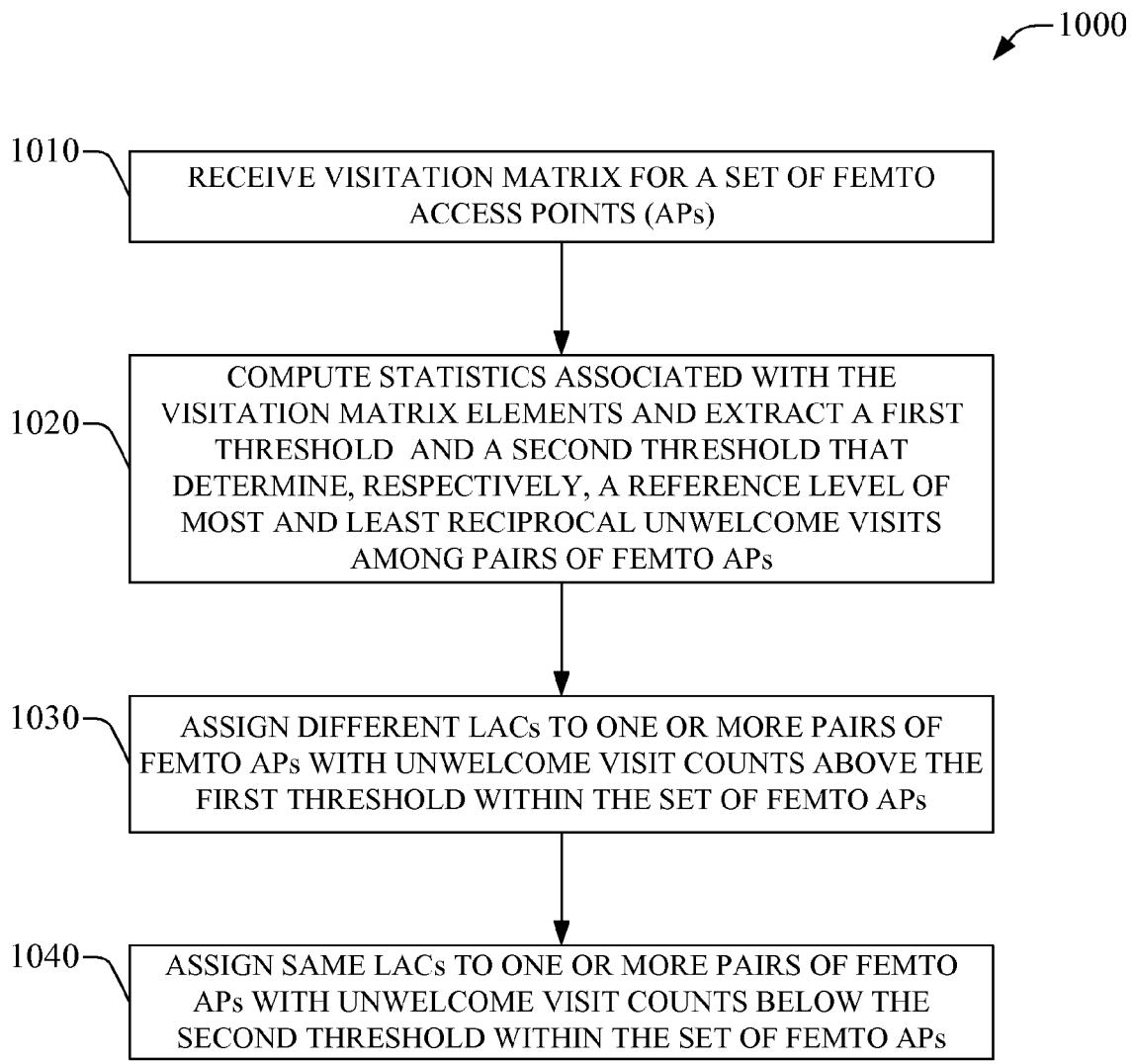
FIG. 10 is a flowchart of an example method for generating a realization of a LAC plan according to aspects described herein.
Figure 11:
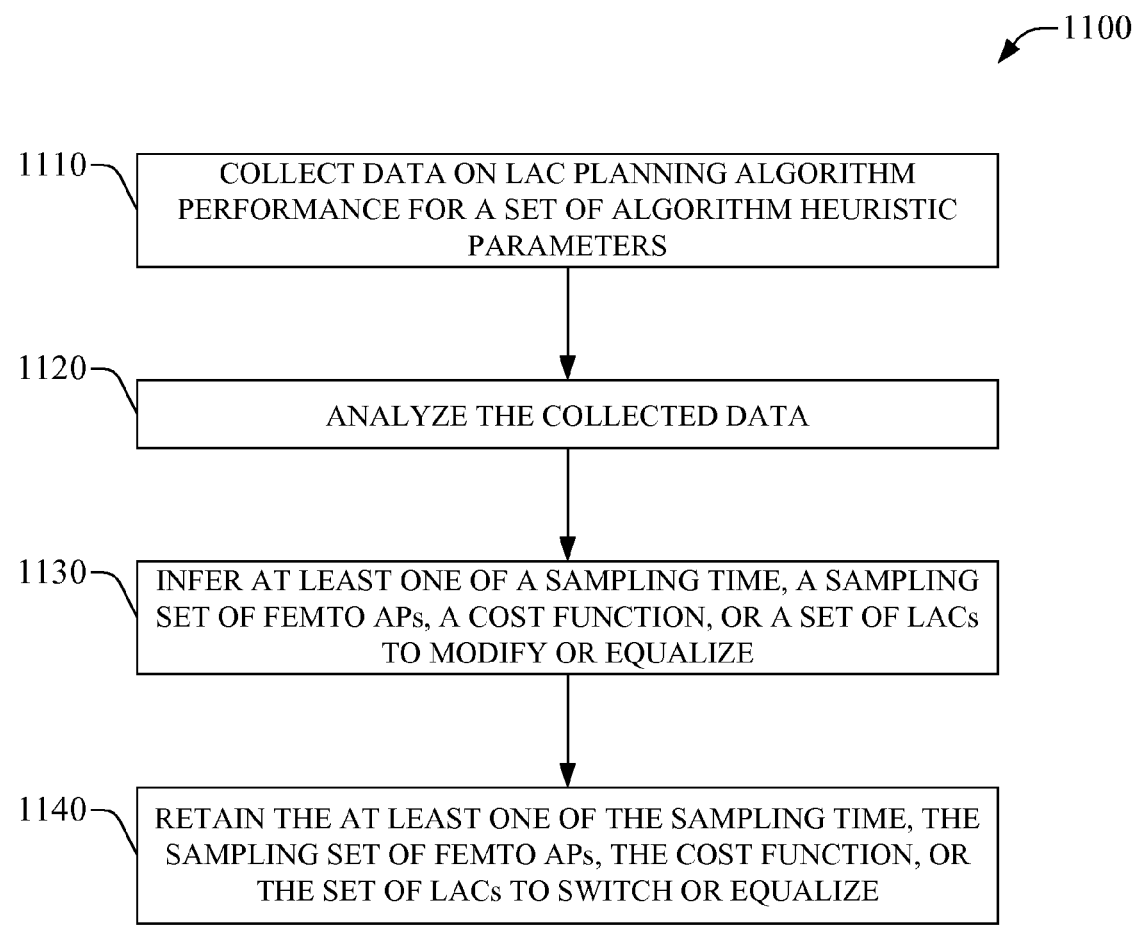
FIG. 11 is a flowchart of an example method for generating a set of heuristics parameters utilized in an automatic LAC planning algorithm according to aspects described herein.

In view of the example systems described above, example methodologies, or methods, that can be implemented in accordance with the disclosed subject matter can be better appreciated with reference to flowcharts in FIGS. 9-11. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram or call flow. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be still further appreciated that the methodologies disclosed hereinafter and throughout this specification are capable of being stored on an article of manufacture to facilitate transporting and transferring such methodologies, or methods, to computers for execution by a processor or for storage in a memory.

FIG. 9 is a flowchart of example method for automatically generating a location area code plan, or reuse plan, according to aspects described herein. It should be appreciated the subject example method can be employed for substantially any, or any, radio paging parameter(s), such as a routing area code. The subject example method 900 can be implemented by one or more components within a mobile network platform (e.g., a core network in cellular telecommunication technologies). A processor that confers, at least in part, functionality to the one or more components can enact, at least in part, the subject example method 900. At act 910, a current location area update (LAC) plan for a set of femto access points is generated. In an aspect, generation of current LAC plan can be based at least in part on historic visitation data available to the component that enacts the subject example method 900. At act 920, the current LAC plan for the set of femto APs is conveyed. In an aspect, the current LAC plan can be conveyed to a network management component (e.g., a radio network controller, or a femto gateway) to configure a set of femto APs. At act 930, visitation data is received for each femto access point in a set of femto access points for a current location area code (LAC) plan for the set of femto APs. The visitation data can be generated through a component that manages macro-to-femto handover or femto-to-macro handover (e.g., mobility component 220).

At act 940, the received visitation data is formatted to facilitate, at least in part, evaluation of a cost function that measures performance of the current LAC plan for the set of femto APs. Received visitation data can be cast into a visitation matrix, which can reveal mobility features among pairs of deployed femto access points in a set of deployed femto APs. In an aspect, performance can be characterized by the type and frequency of rejection mechanism(s) applied to an unauthorized mobile device that attempts accessing a femto access points in the set of femto APs. At act 950, it is checked whether a cost, as assessed through the evaluation of the cost function, is below a tolerance. The tolerance can be established by a network operator based at least in part on complexity to generate an acceptable LAC plan, femto access point floor plan, mobility characteristics of femto subscribers, or the like. When the outcome of act 930 is negative, flow is directed to act 960. Conversely, flow is directed to act 980, in which the current LAC plan is retained for the set of femto access points.

At act 960, an updated LAC plan, or reuse plan, is generated for the set of femto APs. At act 970, the updated LAC plan is adopted, at least in part, as the current LAC plan for the set of femto APs. In an aspect, a predetermined portion of the updated LAC plan can be combined with a previously current LAC plan to generated the current LAC plan; the portion is a heuristic parameter and can depend on a specific algorithm employed to search for a LAC plan reuse that minimizes the cost function. It should be appreciated that such combination of updated and previously current LAC plans can ensure convergence of a search of a LAC plan that minimized the cost function.

FIG. 10 is a flowchart of an example method 1000 for generating a realization of a LAC plan according to aspects described herein. The subject example method 1000 can be employed in conjunction with example method 900. It is to be noted that the subject example method 1000 can be utilized to generate current LAC reuse plan configuration. In an aspect, example method 1000 can be implemented by one or more components within a mobile network platform (e.g., a core network in cellular telecommunication technologies). A processor that confers, at least in part, functionality to the one or more components can enact, at least in part, the subject example method 1000. At act 1010, a visitation matrix for a set of femto access points (see, e.g., FIG. 5) is received. At act 1020, statistics associated with the visitation matrix elements are computed, and a first threshold and a second threshold that determine, respectively, a reference level of most and least reciprocal unwelcome visits among pairs of femto APs are extracted. At act 1030, distinct LACs are assigned to one or more pairs of femto access points with unwelcome visit counts above the first threshold within the set of femto APs. At act 1040, equal LACs are assigned to one or more pairs of femto APs with unwelcome visit counts below the second threshold within the set of femto APs.

FIG. 11 is a flowchart of an example method 1100 for generating a set of heuristics parameters utilized in an automatic LAC planning algorithm according to aspects described herein. In an aspect, example method 1100 can be implemented by one or more components within a mobile network platform (e.g., femto network platform 109). A processor that confers, at least in part, functionality to the one or more components can enact, at least in part, the subject example method 1100. At act 1110, data on performance of an automatic LAC planning algorithm for a set of heuristic parameters is collected. At act 1120, the collected data is analyzed. Analysis can include extraction of correlations among various heuristics parameters than determine implementation of the automatic LAC planning algorithm. At act 1130, at least one of a sampling time, a sampling set of femto APs, a cost function, or a set of LACs to modify or equalize are inferred. Various machine learning methods, as discussed above, can be employed to infer the aforementioned quantities. The set of LACs to modify or equalize refers to the number of LACs involved in generating an updated LAC configuration from a current LAC configuration. At act 1140, the at least one of the sampling time (e.g., $\Delta \tau$ 229), the sampling set of femto APs, the cost function, or the set of LACs to switch or equalize are retained. In an aspect, the one or more of such quantities are retained within a memory in the mobile network platform that includes the one or more components that enact the subject example method.

Figure 12:
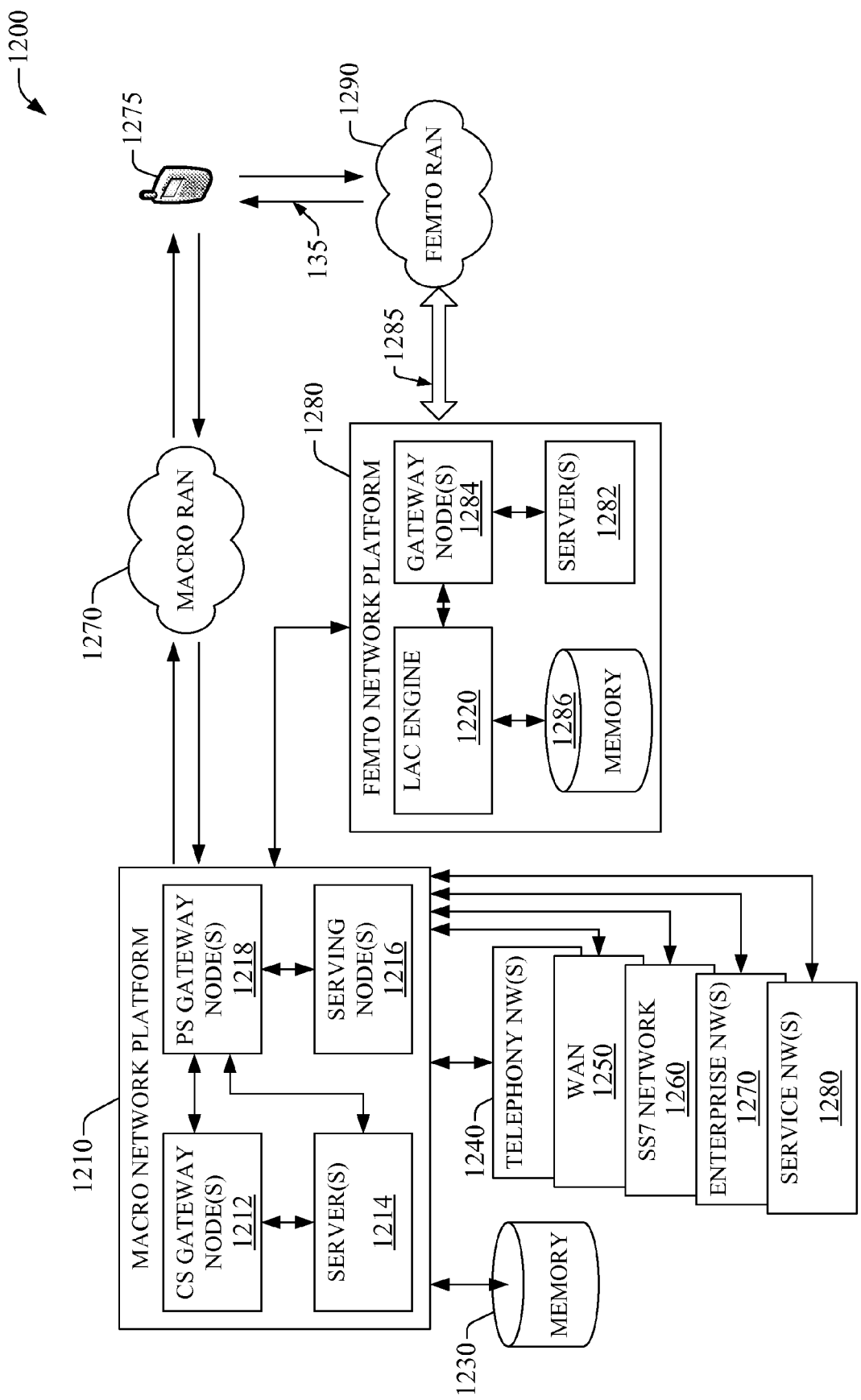
FIG. 12 illustrates example macro and femto wireless network environments that can exploit femto APs that utilize aspects of the subject innovation.

To provide further context for various aspects of the subject specification, FIG. 12 illustrates a block diagram of an example macro and femto wireless network environments that can exploit automatic radio paging parameters, e.g., LACs, generation in accordance with various aspects described herein. Wireless communication environment 1200 includes two wireless network platforms: (i) A macro network platform 1210 which serves, or facilitates communication with user equipment 1275 (e.g., mobile 120$_A$) via a macro radio access network (RAN) 1270. It should be appreciated that in cellular wireless technologies (e.g., 3GPP UMTS, HSPA, 3GPP LTE, 3GPP2 UMB), macro network platform 1210 is embodied in a Core Network. (ii) A femto network platform 1280, which can provide communication with UE 1275 through a femto RAN 1290, which is linked to the femto network platform 1280 via backhaul pipe(s) 1285 (e.g., backhaul link(s) 153). It should be appreciated that macro network platform 1210 typically hands off UE 1275 to femto network platform 1210 once UE 1275 attaches (e.g., through macro-to-femto handover) to femto RAN 1290, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 105, while femto RAN 1290 can comprise multiple femto cell access points such as femto AP 130. Deployment density in femto RAN 1290 is substantially higher than in macro RAN 1270.

Generally, both macro and femto network platforms 1210 and 1280 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1210 includes CS gateway node(s) 1212 which can interface CS traffic received from legacy networks like telephony network(s) 1040 (e.g., public switched telephone network (PSTN), or public land mobile network (PLMN)) or a SS7 network 1260. Circuit switched gateway 1212 can authorize and authenticate traffic (e.g., voice) arising from such networks. Additionally, CS gateway 1212 can access mobility, or roaming, data generated through SS7 network 1260; for instance, mobility data stored in a VLR, which can reside in memory 1230. Moreover, CS gateway node(s) 1212 interfaces CS-based traffic and signaling and gateway node(s) 1218. As an example, in a 3GPP UMTS network, PS gateway node(s) 1218 can be embodied in gateway GPRS support node(s) (GGSN).

In addition to receiving and processing CS-switched traffic and signaling, PS gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250, enterprise networks (NW(s)) 1270 (e.g., enhanced 911), or service NW(s) 1280 like IP multimedia subsystem (IMS); it should be appreciated that local area network(s) (LANs), which may be a part of enterprise NW(s), can also be interfaced with macro network platform 1210 through PS gateway node(s) 1218. Packet-switched gateway node(s) 1218 generates packet data contexts when a data session is established. To that end, in an aspect, PS gateway node(s) 1218 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1214. It is to be noted that in 3GPP UMTS network(s), gateway node(s) 1018 (e.g., GGSN) and tunnel interface (e.g., TTG) comprise a packet data gateway (PDG).

Macro network platform 1210 also includes serving node (s) 1216 that convey the various packetized flows of information, or data streams, received through PS gateway node(s) 1218. As an example, in a 3GPP UMTS network, serving node(s) can be embodied in serving GPRS support node(s) (SGSN).

As indicated above, server(s) 1214 in macro network platform 1210 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1210. Data streams can be conveyed to PS gateway node(s) 1218 for authorization/authentication and initiation of a data session, and to serving node(s) 1216 for communication thereafter. Server(s) 1214 can also effect security (e.g., implement one or more firewalls) of macro network platform 1210 to ensure network's operation and data integrity in addition to authorization and authentication procedures that CS gateway node(s) 1212 and PS gateway node(s) 1218 can enact. Moreover, server(s) 1214 can provision services from external network(s), e.g., WAN 1250, or Global Positioning System (GPS) network(s), which can be a part of enterprise NW(s) 1280. It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN 1250, SS7 network 1260, enterprise NW(s) 1270, or service NW(s) 1280.

Regarding femto network platform 1280, it includes a femto gateway node(s) 1284, which have substantially the same functionality as PS gateway node(s) 1218. Additionally, femto gateway node(s) 1284 can also include substantially all functionality of serving node(s) 1216. Disparate gateway node(s) 1284 can control or operate disparate sets of deployed femto APs, which can be a part of femto RAN 1290. In an aspect of the subject innovation, femto gateway node(s) 1284 can aggregate operational data received from deployed femto APs. Moreover, femto gateway node(s) 1284, can convey received attachment signaling to attachment component 1220. It should be appreciated that while attachment component is illustrated as external to gateway node(s) 1284, attachment component 1220 can be an integral part of gateway node(s) 1284.

Location area code engine 1220 can facilitate automatic generation of LAC reuse plan(s) in accordance with aspects described herein. Server(s) 1282 can embody at least in part a mobility component that provides visitation data to LAC engine 1220 to generate the LAC reuse plan(s), or substantially any, or any, radio paging parameters.

Memory 1286 can retain additional information relevant to operation of the various components of femto network platform 1280. For example operational information that can be stored in memory 1286 can comprise, but is not limited to, subscriber intelligence; contracted services; maintenance and service records; femto cell configuration (e.g., devices served through femto RAN 1290; authorized subscribers associated with one or more deployed femto APs); service policies and specifications; privacy policies; add-on features; so forth.

Server(s) 1282 have substantially the same functionality as described in connection with server(s) 1214. In an aspect, server(s) 1282 can execute multiple application(s) that provide service (e.g., voice and data) to wireless devices served through femto RAN 1290. Server(s) 1282 can also provide security features to femto network platform. In addition, server(s) 1282 can manage (e.g., schedule, queue, format . . . ) substantially all packetized flows (e.g., IP-based, frame relay-based, ATM-based) it generates in addition to data received from macro network platform 1210. Furthermore, server(s) 1282 can effect provisioning of femto cell service, and effect operations and maintenance. It is to be noted that server(s) 1282 can include one or more processors configured to provide at least in part the functionality of femto network platform 1280. To that end, the one or more processors can execute code instructions stored in memory 1286, for example.

Various aspects or features described herein may be implemented as a method; apparatus, either as hardware or hardware and software or firmware; or article of manufacture using standard programming and/or engineering techniques. Implementation(s) that include software or firmware can be implemented at least in part through program modules stored in a memory and executed by a processor. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs [e.g., compact disk (CD), digital versatile disc (DVD), Blu-ray disc (BD) . . . ], smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, the term "memory" refers to data stores, algorithm stores, and substantially any other information store relevant to operation and functionality of a component comprising the memory; for instance, such information can comprise, but is not limited to, signaling metric thresholds, historic attachment data, subscriber information, femto cell configuration (e.g., devices served by a femto AP), location identifiers, and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes," "has," "possesses," and the like are used in either the detailed description or the claims, such terms are intended to be inclusive in a manner similar to the term "comprising" as "comprising" is interpreted when employed as a transitional word in a claim.

What is claimed is:

1. A method, comprising:
receiving, by a system comprising a processor, visitation data for a set of femto access point devices;
in response to determining based on the visitation data that failed attachment attempt counts associated with femto access point devices of the set of femto access point devices satisfy a first condition with respect to a first number of failed attachment attempts associated with rejected access of the femto access point devices, assigning, by the system, different location area codes to the femto access point devices and modifying, by the system, a location area code plan for the set of femto access point devices utilizing the different location area codes; and
creating, by the system, data representing a visitation matrix based on the set of femto access point devices and a cost function associated with the location area code plan, wherein a matrix element of the visitation matrix comprises a count of other failed attachment attempts associated with a second femto access point device of the set of femto access point devices that is associated with a subscriber station device being authorized to attach to a first femto access point device of the set of a femto access point devices, and wherein the subscriber station device is not authorized to attach to the second femto access point device.

2. The method of claim 1, wherein the assigning further comprises:
computing statistics associated with matrix elements comprising the matrix element; and
assigning, based on the statistics, distinct location area codes to a pair of femto access point devices, of the femto access point devices, associated with a second number of other failed attachment attempts greater than the first number of failed attachment attempts.

3. The method of claim 1, further comprising determining, by the system, an algorithmic performance for a set of algorithmic heuristic parameters associated with the location area code plan.

4. The method of claim 3, wherein the determining the algorithmic performance further comprises determining the algorithmic performance based on the cost function.

5. The method of claim 4, further comprising minimizing, by the system, the cost function.

6. A system, comprising:
a memory to store executable instructions; and
a processor, coupled to the memory, that facilitates execution of the executable instructions to perform operations, comprising:
receiving visitation data for femto access point devices;
in response to determining, based on the visitation data, that failed attachment attempt counts associated with the femto access point devices satisfy a first condition based on a first number of failed attachment attempts regarding rejected access of the femto access point devices, assigning disparate location area codes to the femto access point devices;
in response to the assigning of the disparate location area codes, generating a location area code reuse plan comprising the disparate location area codes; and
formatting the visitation data to obtain, based on a defined cost function associated with the location area code reuse plan, data representing a visitation matrix, wherein an element of the visitation matrix is associated with a count of other failed attachment attempts associated with a first femto access point device of the femto access point devices that is associated with a subscriber station device authorized to attach to a second femto access point device of the femto access point devices, and wherein the subscriber station device is not authorized to attach to the first femto access point device.

7. The system of claim 6, wherein the operations further comprise:
generating the location area code reuse plan based on the visitation data.

8. The system of claim 7, wherein the operations further comprise:
receiving updated data representing an updated visitation matrix; and
generating another location area code plan based on the updated data.

9. The system of claim 8, wherein the generating the other location area code plan further comprises generating the other location area code plan based on another cost function associated with a defined search.

10. The system of claim 9, wherein the defined search is based on a monte carlo based calculation.

11. The system of claim 9, wherein the other cost function is based on matrix elements of the updated visitation matrix.

12. The system of claim 7, wherein the operations further comprise:
assigning the disparate location area codes to the femto access point devices in response to the femto access point devices being determined to be associated with a failed attachment attempt count that is larger than failed attachment attempt counts of remaining femto access point devices.

13. A non-transitory computer-readable storage medium comprising computer executable instructions that, in response to execution, cause a computing system comprising a processor to perform operations, comprising:
receiving visitation data for a set of femto access point devices;
assigning, based on the visitation data, distinct location area codes to a pair of femto access point devices of the set of femto access point devices in response to failed attachment attempt counts associated with the pair of femto access point devices being determined to satisfy a first criterion based on a first number of failed attachment attempts regarding rejected access of the pair of femto access point devices;
modifying a location area code plan for the pair of femto access point devices based on the distinct location area codes; and
generating data comprising a visitation matrix based on the visitation data and a defined cost function associated with the location area code plan, wherein a matrix element of the visitation matrix represents a count of other failed attachment attempts associated with a second femto access point device of the set of femto access point devices that is associated with a subscriber station device authorized to attach to a first femto access point device of the set of femto access point devices, and wherein the subscriber station device is not authorized to attach to the second femto access point device.

14. The non-transitory computer-readable storage medium of claim 13, wherein the assigning the distinct location area codes further comprises:
computing statistics associated with matrix elements of the visitation matrix;
determining other failed attachment attempts among pairs of femto access point devices of the set of femto access point devices; and
assigning, based on the statistics, the distinct location area codes to one of the pairs of femto access point devices that is associated with at least a portion of the other failed attachment attempt counts determined to be above the first number of the failed attachment attempts.

15. The method of claim 1, further comprising:
in response to determining, based on the visitation data, that the failed attachment attempt counts satisfy a second condition with respect to a second number of failed attachment attempts, assigning a location area code to the femto access point devices utilizing the location area code plan.

16. The system of claim 6, wherein the operations further comprise:
assigning, based on the visitation data, a common location area code of the location area code reuse plan to the femto access point devices in response to determining that the failed attachment attempt counts satisfy a second condition based on a second number of failed attachment attempts.

17. The non-transitory computer-readable storage medium of claim 13, wherein the operations further comprise:
assigning, based on the visitation data, a location area code to the pair of the femto access point devices in response to determining that the failed attachment attempt counts satisfy a second criterion based on a second number of failed attachment attempts according to the location area code plan.

* * * * *